United States Patent [19]

Flyaks et al.

[11] Patent Number: 5,853,578
[45] Date of Patent: Dec. 29, 1998

[54] METHOD FOR BIOLOGICAL PURIFICATION OF LIQUIDS AND BIOLOGICAL FILTER FOR PURIFICATION OF LIQUIDS

[76] Inventors: Nina Flyaks; Alexander Shkolnik, both of 485 Dartmouth Ave., San Carlos, Calif. 94070

[21] Appl. No.: 677,848

[22] Filed: Jul. 10, 1996

[51] Int. Cl.⁶ .................................................. B01D 24/02
[52] U.S. Cl. .................. 210/169; 210/151; 210/198.1; 210/202; 210/205; 210/266; 210/284; 210/289
[58] Field of Search .................................. 210/150, 151, 210/169, 198.1, 202, 205, 258, 266, 284, 289, 291, 617, 903

[56] References Cited

U.S. PATENT DOCUMENTS

| | | | |
|---|---|---|---|
| 3,649,532 | 3/1972 | McLean | 210/151 |
| 3,933,629 | 1/1976 | Smith | 210/150 |
| 3,956,128 | 5/1976 | Turner | 210/150 |
| 4,274,966 | 6/1981 | Palmer | 210/150 |
| 5,240,611 | 8/1993 | Burton | 210/151 |
| 5,462,666 | 10/1995 | Kimmel | 210/151 |
| 5,578,214 | 11/1996 | Yamasaki et al. | 210/151 |

*Primary Examiner*—Jay H. Woo
*Assistant Examiner*—Betsey J. Morrison

[57] ABSTRACT

A biological filter for purification of liquids has primary filtering stages (52a, 52b, 52c) of a particulate material and secondary filtering stages (54, 56, 58) containing a fine-fiber material. The particulate material and fine-fiber material are covered with a biofloc film. The primary filtering stages (52a, 52b, 52c) and the secondary filtering stages (54, 56, 58) form a succession of filtering groups, and liquid is caused to move through the succession of filtering groups. Liquid is aerated during movement through the succession of filtering groups.

44 Claims, 5 Drawing Sheets

METHOD FOR BIOLOGICAL PURIFICATION OF LIQUIDS AND BIOLOGICAL FILTER FOR PURIFICATION OF LIQUIDS

FIELD OF THE INVENTION

The invention relates to biological purification of liquids and, more particularly, it deals with purification of waste liquors and natural water. More specifically, the invention can be used in various biotechnological applications, in particular, in providing closed-loop water-supply systems for breeding various classes of animals: from zooplankton to invertebrates, to fish and to mammals. Such systems are coming into use to ensure almost complete water recycling. The invention may also be used for purification of natural surface, ground and artesian waters from naturally present admixtures such as heavy metals, organic and inorganic admixtures.

BACKGROUND OF THE INVENTION

Natural waters, both surface and ground waters, are known to contain numerous inorganic and organic admixtures, especially nowadays in view of a heavy technogenic load on the environment. On the other hand, many production processes using water are the sources of waste liquors that contain numerous admixtures resulting from the production process. Attempts have been made to recycle water in many industrial processes, and some of these attempts were successful. This is true of such processes were water contains a limited set of admixtures, e.g. either predominantly organic or predominantly inorganic admixtures, so that a specific process or bacterial treatment would suffice to purify water. It should be also noted that many production processes impose limited requirements upon quality of purified water.

In dealing with biotechnology, requirements imposed upon water to be supplied to various living organisms are very stringent, because survival, development and growth of any living organism depends greatly, among other things, on water quality. On the other hand, if complete water recycling is to be ensured in a biotechnological system, there is another problem: waste liquors containing products of life activity of various living organisms are very difficult to purify. This is because they contain large quantities of ammonia and/or urea that have to be removed if one is to ensure high survival rate and normal development of various living organisms. Purity of water is a special concern in breeding such living organisms as zooplankton, crayfish, fish, amphibians, reptiles, and mammals.

Known biological filters are mainly intended for purification of liquids from a certain class of admixtures. Thus there are many filters in which certain bacteria remove hydrocarbons from waste liquor (U.S. Pat. No. 5,389,248 to Pare, et al., 1995.) This concept cannot be used for a comprehensive water treatment, and it can be assumed that other water treatment methods have to be used such as filtration, aeration, separation of various admixtures.

It is known to use nitrifying bacteria such as *Nitrosomonas sp.* and *Nitrobacteria sp.* for removing ammonia arid urea from water. These bacteria form a so-called biofloc film on various substrates and consume ammonia and urea by assimilating them through nitrification. As a result, it does not contain urea and ammonia water after this biological treatment, and all useful substances such as vitamins and others remain in the water and are fed with water to living consumers. An example of a biological filter based on this concept is disclosed in U.S. Pat. No. 5,445,740 to Malone, 1995. Water is caused to pass through a vessel having an agitator. The vessel contains floating media covered with a biofloc film. Bacteria in the biofloc film remove a certain part of ammonia from water, and the agitator is needed to remove sediment accumulated on the pellets forming the media. This sediment is discharged from the vessel at regular intervals. This filter also lowers BOD (biochemical oxygen demand) of water. The filter is mainly used for closed water recirculating systems for breeding fish. This prior art filter is primarily deficient in that it cannot completely remove ammonia with high ammonia levels, e. g. when water to be purified is fed from water reservoirs for breeding amphibians, alligators, turtles, nutria, and the like. Another serious disadvantage of this biological filter resides in the fact that it cannot substantially purify water from urea. Thus water cannot be supplied for consumption by living organisms. This filter cannot ensure a comprehensive treatment of waste liquor including removal of heavy metals. Such heavy metals can be present not only in water supplied from a natural source, but also in the recycled water, because heavy metals can be brought into environment of living organisms, e. g. with feed. This prior art biological filter requires saturation of water with oxygen after purification. The use of an agitator for filtering media is power consuming. The filter should have a motor and mechanical parts that require maintenance. It will be understood that this prior art biological filter is expensive to manufacture; it is unreliable and cannot provide for a comprehensive water purification.

SUMMARY OF THE INVENTION

It is an object of the invention to provide a method for biological purification of liquids and a biological filter that would ensure a comprehensive purification of liquids.

Another object of the invention is to provide a method for biological purification of liquids and a biological filter that would be capable of removing ammonia and urea present with high level of these substances in liquids.

Still another object of the invention is to provide a method for biological purification of liquid and a biological filter that would be capable of ensuring a comprehensive treatment of waste liquors.

Further object of the invention is to provide a compact biological filter for purification of liquids, that would have no moving parts.

Finally, it is an object of the invention to provide a method for biological purification of liquids and a biological filter that would be of a low cost and require minimum maintenance.

With these and other objects in view, a method for biological purification of liquids according to the invention, in which liquid is caused to pass through various materials covered with a biofloc film, involves causing liquid to pass through a first bed of a particulate material, then causing liquid to move at least to a second bed of a particulate material and to pass through this bed of a particulate material, the liquid being aerated during movement from the first bed of a particulate material to the second bed of a particulate material.

A biological filter for purification of liquid has primary filtering stages and secondary filtering stages, each secondary filtering stage containing a fine-fiber material. The primary filtering stages and the secondary filtering stages form a succession of filtering groups, and liquid is caused to move through the succession of filtering groups. Liquid is aerated during movement through the succession of filtering groups.

BRIEF DESCRIPTION OF THE DRAWINGS

Other distinctions and advantages of the invention will now be described with reference to the accompanying drawings in which.

DESCRIPTION OF PREFERRED EMBODIMENTS

Figure 1:
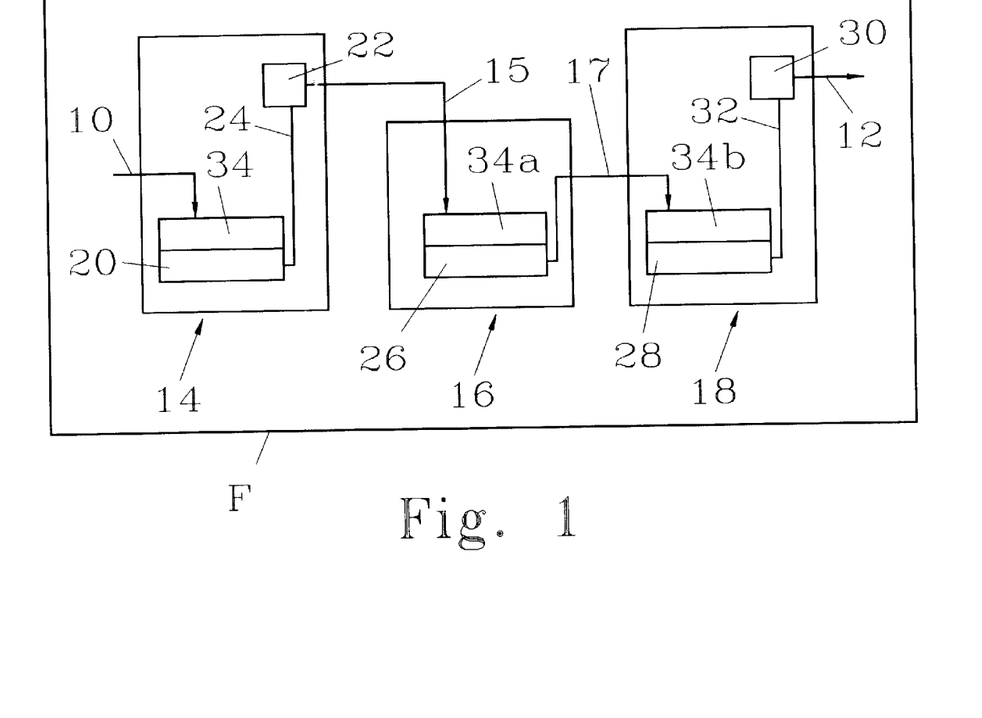
FIG. 1 is a schematic diagram illustrating a method for biological purification of liquids.

With reference to FIG. 1 which schematically illustrates a method for biological purification of liquids according to the invention, liquid to be purified such as natural water or waste liquor, e. g. from biological objects (such as small aquatic organisms, amphibians, alligators, fish, mammals, etc.) is supplied for purification through an inlet 10 of a biological filter generally shown at F and is removed after purification through an outlet 12. Purification of liquid takes place in a biological filter which is in the form of a succession of filtering groups 14, 16 and 18 interconnected as shown by lines 15, 17. Typically, a filtering group such as filtering group 14 includes a primary filtering stage 20 and a secondary filtering stage 22 interconnected by a line 24. Filtering group 16 has only a primary filtering stage 26 and does not have a secondary filtering stage. Filtering group 18 has a primary filtering stage 28 and a secondary filtering stage 30 which is connected to outlet 12.

Figure 1A:
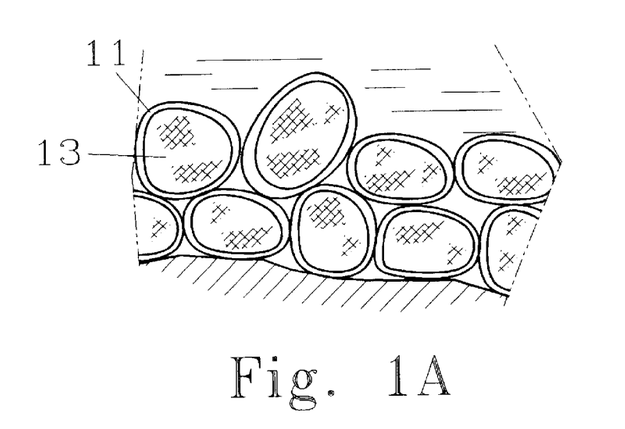
FIG. 1A illustrates particles of a filtering bed covered with a biofloc film.

The term "primary filtering stage" here means at least one bed of a particulate material including any solid particulate materials that are suitable for use in systems for breeding living organisms. It will be apparent that the choice of specific filtering materials depends on specific purpose of a given primary filtering stage. Thus, if biological purification is used for purification of water containing heavy metals, a primary filtering stage, preferably, primary filtering stage 20 of first filtering group 14 has to contain a bed of activated carbon known to be very effective in retaining salts of heavy metals. By the same token, if water pH has to be corrected, primary filtering stage 26 of filtering group 16 can have a bed of at least one salt selected from the group consisting of salts of alkali and alkali-earth metals such as calcite, sodium thiophosphate, sodium bicarbonate, etc. for alkalization of water. Primary filtering stage 28 of filtering group 18 can be dedicated to intensive removal of ammonia and urea from water. For this purpose, this primary filtering stage preferably contains a bed of zeolite, small plastic pellets or rings, as well as fluorite, feldspar, mica, fine cullet, fine particles of organic glass and the like. It should be noted that all primary filtering stages 20, 26, 28, in addition to the above-mentioned materials, preferably have a bed 34, 34a, 34b, respectively, of a particulate material such as gravel, crushed stone, pebble stone, sand, expanded clay, crushed shell rock, and like inert mineral materials. This additional bed (34, 34a, 34b) constitutes a prefiltering bed retaining suspended matter (organic and inorganic substances.) In addition, nitrifying bacteria form a biofloc film on particles of the prefiltering bed. As shown in FIG. 1A, this biofloc film 11 is formed on particles 13 and removes ammonia and urea from water as bacteria consume them for their life activity. It will be apparent to those skilled in the art that the above-mentioned biofloc film 11 can form and exist if certain conditions are provided (the temperature of 25° to 30° C. and water velocity 1.5 to 5 cm/s.) It should be, however, noted that if water is caused to pass only through a bed of a particulate material covered with a biofloc film, it cannot be purified from ammonia and urea to such an extent as to be suitable for consumption by living organisms. This is why the method according to the invention makes use of secondary filtering stages.

The term "secondary filtering stage" means a vessel containing a fine-fiber material. Examples of such fine-fiber material are synthetic fiber, mineral wool, non-woven materials, etc. The most preferred fine-fiber material is tangled monofilament, for example, wastes from thin fishing line manufacture. It is understood that every fiber of the fine-fiber material of the secondary filtering stages is also covered with biofloc film 11 similar to that shown in FIG. 1A, and bacteria in this film also consume ammonia and urea under the conditions described above.

Although it is understood that the multiple treatment of liquid in the primary filtering stages and in the secondary filtering stages can enhance removal of admixtures and, especially, ammonia and urea, this multiple treatment per se cannot bring about a dramatic improvement over prior art. According to the invention, the liquid moving from primary filtering stages 20, 28 and 26 to secondary filtering stages 22, 30 and to primary filtering stage 28, respectively, is aerated during this movement. Aeration brings oxygen to the liquid moving to a next primary filtering stage. When liquid rich in oxygen reaches the next primary filtering stage, it provides bacteria in the biofloc film with additional amount of oxygen, thus materially enhancing the ability of bacteria to assimilate ammonia and urea left in the liquid. This is why the combination of repeated filtration with aeration between various filtering steps allows the process to become much more efficient, especially as regards removal of nitrogen compounds. This method also makes it possible to ensure purification of liquid from nitrogen compounds to a purity of 98.96% to 99.3% in a single compact filter.

It will be understood that the number of primary filtering stages and secondary filtering stages, the number of secondary filtering stages in each filtering group, their position, and choice of specific materials in each bed can vary depending on application and degree of contamination of liquid with various admixtures.

As mentioned above, liquid moving through the various filtering beds is aerated during this movement. If liquid is moved by means of a pump, some aeration device should be provided. It is, however, preferred that aeration be ensured by moving liquid by means of an airlift device. Thus, if liquid is moved within a filtering group, i. e. from a primary filtering stage to a secondary filtering stage by an airlift device, the liquid will be automatically saturated with air and enriched with oxygen. Thus bacteria in biofloc film 11 covering a fine-fiber material in the secondary filtering stage will have better conditions for nitrification, and liquid will be purified from nitrogen compounds much more efficiently.

Figure 2:
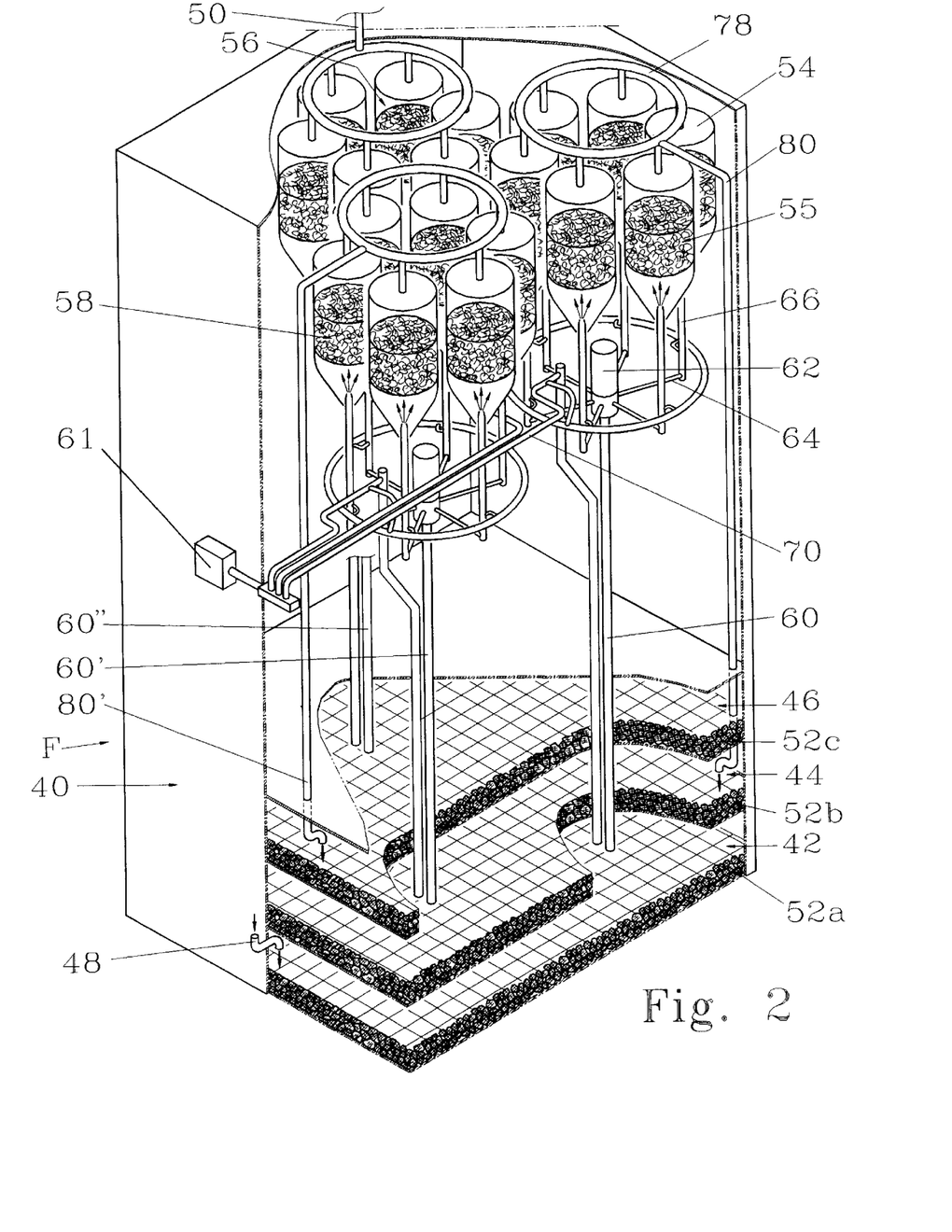
FIG. 2 schematically shows a general perspective view of a biological filter for purification of liquids according to the invention.

An embodiment of a biological filter shown in FIG. 2 illustrates general arrangement of various primary filtering stages and the airlift concept.

As shown in FIG. 2, a biological filter F has a casing 40 divided into three primary filtering stages in the form of closed compartments 42, 44 and 46. Casing 40 has an inlet 48 and an outlet 50 for liquid to be treated. Compartments 42, 44 and 46 are vertically arranged in casing 40. Each compartment 42, 44, 46 has a bed of particulate material 52a, 52b, 52c, respectively. Mounted in the top part of casing 40 there are secondary filtering stages 54, 56, 58. These secondary filtering stages are made in the form of at least one vessel containing a fine-fiber material 55 such as described above. The primary filtering stages or closed compartments 42, 44, 46 define with respective secondary filtering stages 54, 58, 56 a succession of filtering groups. A first filtering group consists of closed compartment 42 and secondary filtering stages 54. Bed of a particulate material 52a in closed compartment 42 is connected to the secondary filtering stages by means of a liquid line 60 terminating in an expander 62. Line 60 is branched at 64 to communicate with a riser 66 of secondary filtering stage 54.

Figure 3:
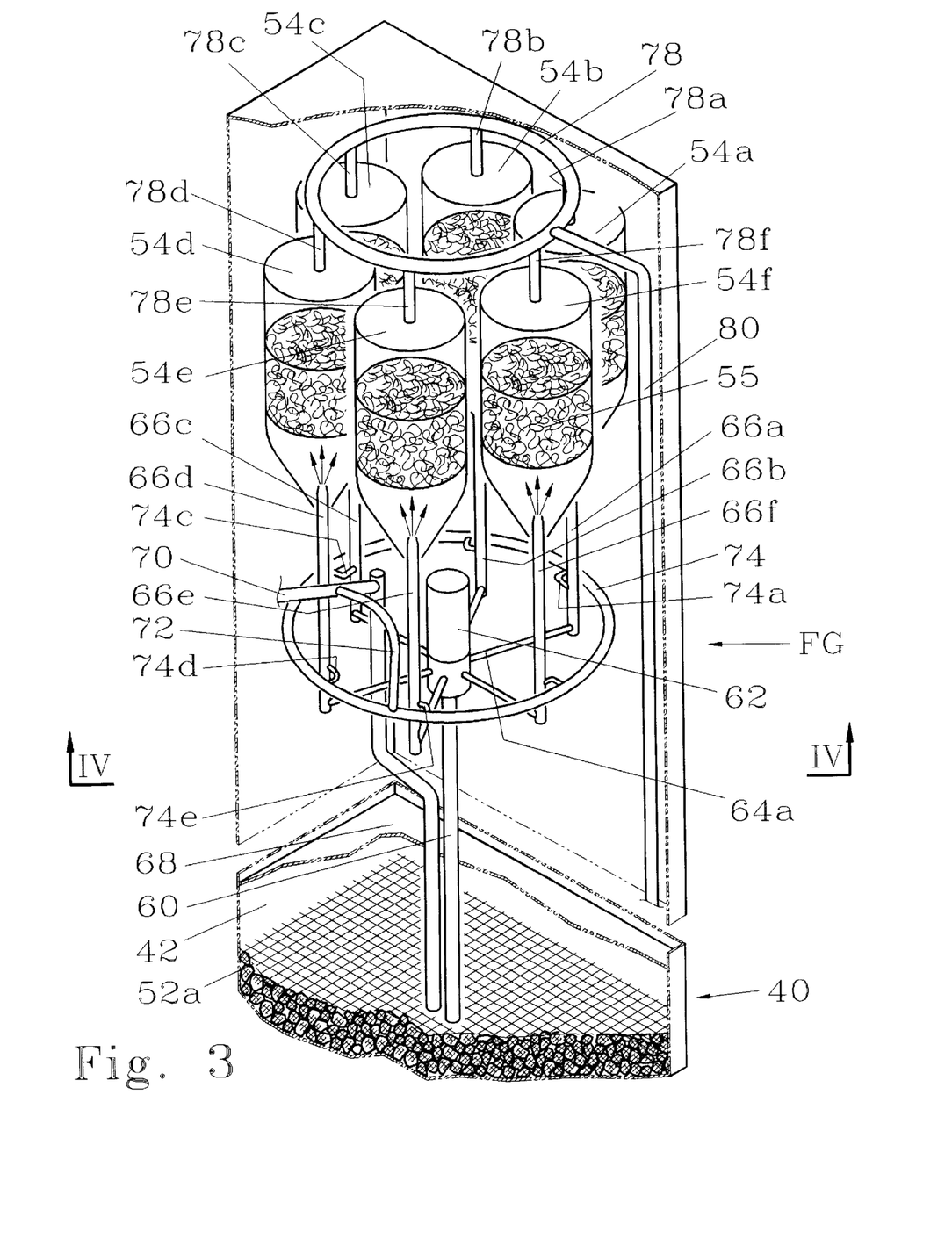
FIG. 3 shows, in greater detail, an enlarged fragmentary view of one filtering group of the biological filter shown in FIG. 2.

For explanation, one filtering group is shown in greater detail in FIG. 3. Line 60 connects primary filtering stage or closed compartment 42, namely its bed 52a of a particulate material to secondary filtering stage 54. Each secondary filtering stage or vessel 54a, b, c, d, e, f has a riser 66a, b, c, d, e, f connected to line 60 through branches 64a, b, c, d, e, f. An air line 68 (FIGS. 3, 4) connected to a source of compressed air (or oxygen) such as compressor 61 (FIG. 2) by an air supply line 70 connects to liquid line 60 substantially at the level of bed 52a, and air is supplied to line 68 to lift the liquid that has passed through bed 52a. This occurs in accordance with the airlift concept well known to those skilled in the art. Air supply line 70 which is connected to compressor 61 is branched at 72 (FIGS. 3 and 4) to supply compressed air to an air supply manifold 74 having connectors 76a, b, c, d, e, f for supplying air from air supply manifold 74 to secondary filtering stages 54a through 54f. Liquid admitted to compartment 42 through inlet 48 is moved along liquid line 60 by air supplied through air line 68 and is aerated with this air. Liquid from expander 62 is caused to move up into secondary filtering stages under the effect of additional air supplied through air supply manifold 74 and is additionally aerated. A liquid manifold 78 is connected to secondary filtering stages 54a through 54f by means of connectors 78a through 78f and connects to a liquid return line 80 to discharge the liquid that passed through secondary filtering stages 54a through 54f to next primary filtering stage or closed compartment 44 in which liquid is to pass through bed 52b of a particulate material. It will be understood that this liquid will enter compartment 44 (FIG. 2) in the aerated form, thus enhancing conditions for activity of bacteria in biofloc film 11 (FIG. 1A.) It should be noted that air bubbles are also formed inside liquid line 60 and liquid return line 80. This means that aeration takes place in the entire system of the biological filter. Suspended matter entrained with the liquid partly adheres to the inner walls of the liquid lines and is then evacuated with liquid. It will be apparent that conditions for activity of bacteria in biofloc film 11 as described above can be provided, e. g. by thermostating the entire systems with the use of thermocontrolled heaters (not shown) in liquid lines as is well known to those skilled in the art.

Figure 4:
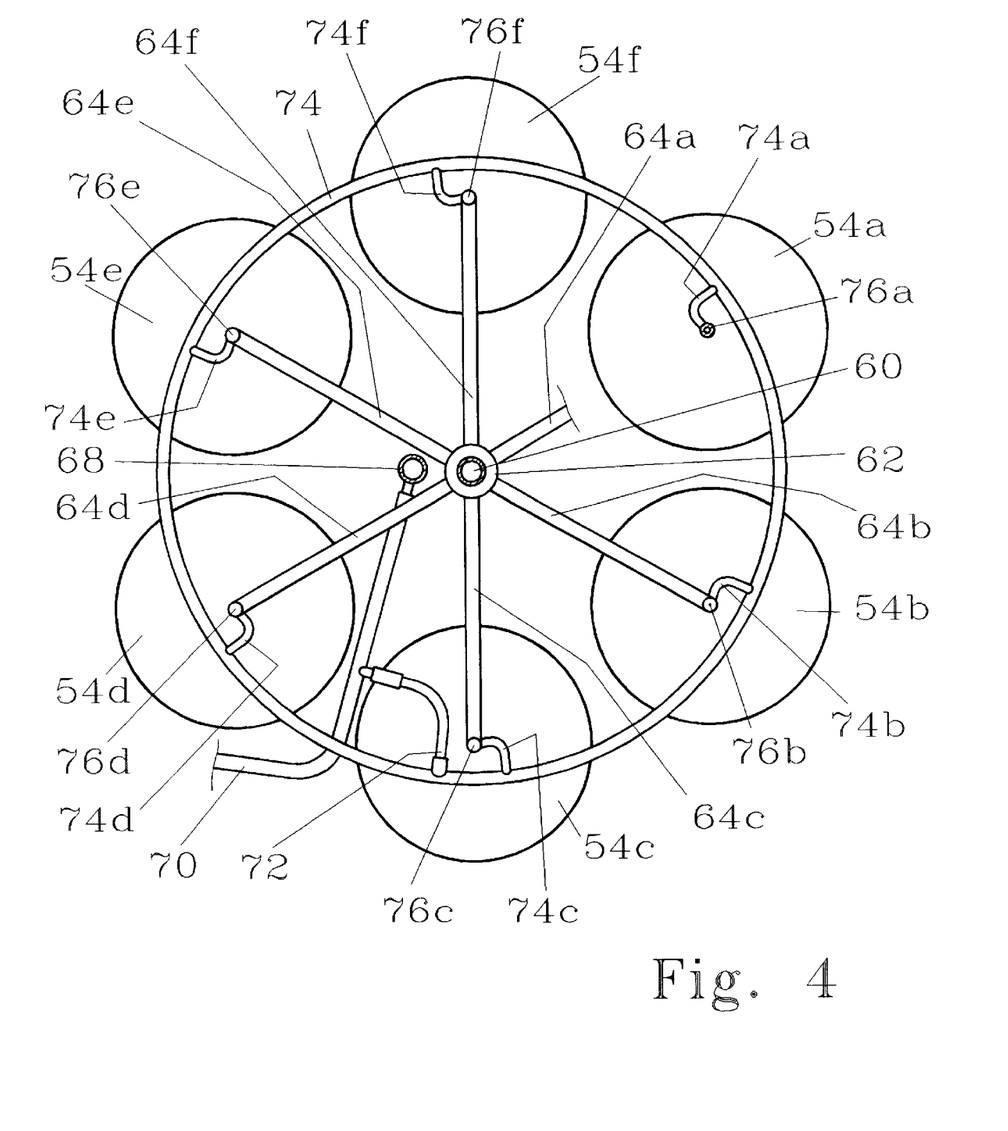
FIG. 4 is an enlarged view taken along line IV—IV in FIG. 3.

The other filtering groups such as those formed by closed compartments 44, 46 and secondary filtering stages 56 and 58 are constructed and function similar to the above described filtering group shown in detail in FIGS. 3, 4.

Figure 5:
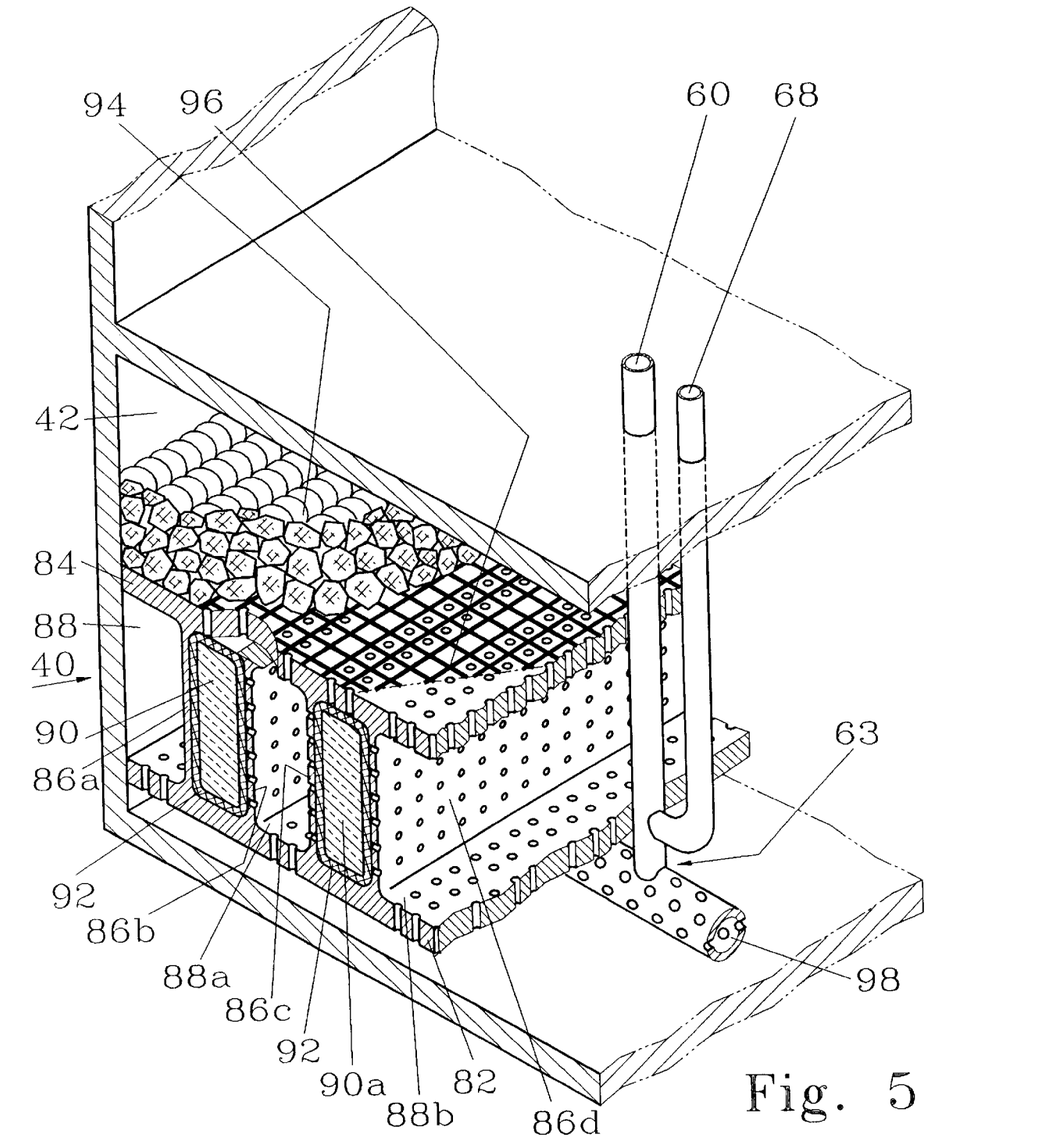
FIG. 5 schematically shows an enlarged perspective fragmentary sectional view of a closed compartment of the biological filter shown in FIG. 2.

A closed compartment is shown in detail in FIG. 5. Closed compartment 42 has permeable, e .g. perforated walls 82, 84, and a particulate material 52a such as activated carbon is placed in a filtering space between these walls. In a preferred embodiment, permeable, e. g. perforated partitions 86a through 86 d are provided between perforated walls 82, 84 to define filtering spaces 88, 88a, 88b, and 90, 90a. It is preferred that particulate material 52a be accommodated in every second filtering space 90, 90a as shown in FIG. 5, leaving filtering spaces 88, 88a, 88b empty. This provides for better flow conditions. In this particular embodiment, the walls of empty filtering spaces are lined at 92 with a fibrous felt-like material such as felt, non-woven fabric and the like. This prevents filtering bed particles from being lost from the filtering space. Quality of filtration is also enhanced. It will be understood that wall 84 is not mandatory if only one bed of a particulate material is used. It is, however, preferred that a prefiltering bed 94 of a particulate material such as gravel, crushed stone, pebble stone, sand and the like be provided on wall 84. A net 96 can be placed on wall 84 to prevent loss of filtering material 94 through perforations of wall 84. It will be apparent that biofloc film 11 form on particles 13 of prefiltering bed 94 as shown in FIG. 1A and allows the nitrification process to occur. The liquid coming through bed 94 to bed 52a, which can consist of activated carbon will be freed there from heavy metals. Activated carbon particles are also partly covered with biofloc film so that nitrification process will also go on to a certain extent in bed 52a. The liquid that passed through bed 52a is to be supplied to another filtering group, preferably, through secondary filtering stages 54a through 54f as described above with reference to FIGS. 2 through 4.

It is also preferred that a perforated manifold 98 (FIG. 5) be provided beneath perforated wall 82 to remove the liquid that passed through beds 94 and 52a from closed compartment 42 and to supply it to the secondary filtering stages. Manifold 98 can be, e. g. in the form of a closed-loop pipe (not shown,) and liquid line 60 is connected to the manifold as shown in FIG. 5. Air line 68 of the airlift device is connected to liquid line 60 at a point 63 adjacent to manifold 98 to lift the liquid as described in detail with reference to FIGS. 2 through 4.

Closed compartments 42, 44 and 46 shown in FIG., 2 are constructed similar to closed compartment 42 shown in FIG. 5. These compartments differ only in the kind of filtering materials. It is preferred that prefiltering bed 94 in each closed compartment consist of gravel, sand and the like according to good practice in filtering liquids. Compartment 42 preferably contains activated carbon in bed 52a for removing heavy metals from the liquid. The liquid is purified from suspended matter in bed 94, and nitrogen compounds are also partly removed in this bed. Heavy metals are then retained in activated carbon. After aeration by airlift and fine filtering in secondary filtering stages 54, active nitrification process takes place owing to a very large surface area of fine fibers and intensive aeration. The liquid from these secondary filtering stages then goes to closed compartment 44 in which bed 52b preferably contains a salt selected from the group consisting of alkali and alkali-earth metal salts as described above, in a particulate form. This filtering bed 52b has two functions: that of filtering and nitrification (as the biofloc film is also formed on particles of the filtering bed material) and that of water treatment to adjust pH. It is known that waste liquors, especially from biological objects, such as fish, alligators, and the like are normally very acidic and cannot be used for consumption by living organisms even after filtration and purification from nitrogen compounds. The provision of filtering bed 52b having this dual function allows water to be alkalized simultaneously with purification. This enables any additional treatment stages to be dispensed with.

The liquid removed after purification in closed compartment 44 passes through secondary filtering stages 56 as described above with reference to closed compartment 42, and is then returned to third closed compartment 46 for further purification (FIG. 2.) Liquid in this compartment also passes through a prefiltering bed similar to bed 94 (FIG. 5) for mechanical filtration and then passes through filtering bed 52c that preferably consists of small plastic pellets or rings, fluorite, feldspar, mica, fine cullet, fine organic glass particles, zeolite, etc. All these materials are most preferable for removing nitrogen compounds from water, because they provide ideal conditions for the creation and maintenance of the biofloc film of nitrifying bacteria. Zeolite is preferable because it can absorb nitrogen compounds. The liquid after purification in closed compartment 44 is also fed to secondary filtering stages 58 from which it is removed through outlet 50 (FIG. 2) to be supplied to various users such as living organisms.

Zooplankton capable of assimilating nitrogen compounds such as Daphnia magna, Ceriodaphnia affinis, Brachionus calyciflorus and Brachionus plicatilis can be used in combination with the biofloc film bacteria. In addition to their ability to assimilate nitrogen compounds that are thus removed from the liquid, they can be grown in closed compartments 44, 46 of the biological filter as vendible product (fish feed.)

A biological filter according to the invention has been built in two modifications. One filter had a capacity of 1.2 $m^3$ for a throughput capacity of 4.4 l/s with a flow velocity of 1.5 cm/s. The purity of liquid after the filter was 98.96%. The other filter had a capacity of 0.0024 $m^3$ for a throughput capacity of 0.03 l/s and a flow velocity of 5 cm/s. The purity of liquid after the filter was 99.3%.

It will be understood that various changes and modifications can be made to the above-described method and biological filter without going beyond the spirit and scope of the invention as defined in the appended claims.

Thus casing 40 can have any number of or at least two compartments which can be arranged either vertically or horizontally without going beyond the spirit and scope of the invention.

The filtering groups can have a single secondary filtering stage consisting of one vessel or a plurality of secondary filtering stages.

Although it is preferred that liquid move from primary filtering stages to secondary filtering stages, secondary filtering stages can be installed first in the direction of liquid flow and can be followed by primary filtering stages.

The biological filter can have any desired number of primary filtering stages and secondary filtering stages and can have additional aeration systems. Treatment in primary filtering stages and secondary filtering stages can be combined with other known kinds of waste liquor treatment such as chemical deposition, pH correction, ion-exchange, etc. In the method according to the invention, the biological filter according to the invention can be used in any numbers for repeated treatment of liquid in sets of similar biological filters that can have various combinations of filtering bed materials for any specific application.

We claim:

1. A biological filter for purification of liquid having an inlet, an outlet and filtering materials covered with a biofloc film provided between said inlet and said outlet, said biological filter comprising:

a plurality of primary filtering stages comprising at least two primary filtering stages, each having a bed of a particulate material;

said plurality of primary filtering stages having a first primary filtering stage;

a plurality of secondary filtering stages, each containing a fine-fiber material which is different from the particulate material of the primary filtering stages;

said plurality of secondary filtering stages having a last secondary filtering stage;

said primary filtering stages of said plurality of primary filtering stages and said secondary filtering stages of said plurality of secondary filtering stages forming a succession of filtering groups, each comprising at least one primary filtering stage of said plurality of primary filtering stages;

means for moving said liquid between said filtering groups of said succession of filtering groups;

means for aerating said liquid during movement of said liquid by said means for moving said liquid by aerating means provided in each of said filtering stages;

said inlet of said biological filter being connected to said first primary filtering stage; and said outlet of said biological filter being connected to said last secondary filtering stage.

2. The biological filter of claim 1, wherein said means for moving said liquid and said means for aerating said liquid comprise an airlift device.

3. The biological filter of claim 1, wherein said first primary filtering stage contains a bed of activated carbon.

4. The biological filter of claim 3, wherein said means for moving said liquid and said means for aerating said liquid comprise an airlift device.

5. The biological filter of claim 1, wherein said first primary filtering stage comprises a top bed and a bottom bed, said bottom bed containing activated carbon.

6. The biological filter of claim 5, wherein said means for moving said liquid and said means for aerating said liquid comprise an airlift device.

7. The biological filter of claim 3, wherein one of said plurality of primary filtering stages contains a bed of at least one salt selected from the group consisting of salts of alkali and alkali-earth metals.

8. The biological filter of claim 7, wherein said means for moving said liquid and said means for aerating said liquid comprise an airlift device.

9. The biological filter of claim 5, wherein one of said plurality of primary filtering stages contains a bed of at least one salt selected from the group consisting of salts of alkali and alkali-earth metals.

10. The biological filter of claim 9, wherein said means for moving said liquid and said means for aerating said liquid comprise an airlift device.

11. The biological filter of claim 1, wherein at least one of said plurality of primary filtering stages comprises a closed compartment having at least one permeable wall and a perforated manifold beneath said at least one permeable wall, said compartment accommodating said particulate material, and said manifold communicating with said means for moving said liquid.

12. The biological filter of claim 2, wherein at least one of said plurality of primary filtering stages comprises a closed compartment having at least one permeable wall and a perforated manifold beneath said at least one permeable wall, said compartment accommodating said particulate material, and said manifold communicating with said means for moving said liquid.

13. The biological filter of claim 11, wherein said compartment has partitions defining a plurality of filtering spaces in said compartment, said particulate material being accommodated in every second one of said plurality of filtering spaces.

14. The biological filter of claim 12, wherein said compartment has partitions defining a plurality of filtering spaces in said compartment, said particulate material being accommodated in every second one of said plurality of filtering spaces.

15. The biological filter of claim 13, wherein said compartment has a separating wall defining a prefiltering space extending over said filtering spaces, said prefiltering space containing a bed of a particulate material.

16. The biological filter of claim 14, wherein said compartment has a separating wall defining a prefiltering space extending over said filtering spaces, said prefiltering space containing a bed of a particulate material.

17. A biological filter for purification of liquid having filtering materials covered with a biofloc film, said biological filter comprising:

a casing having an inlet and an outlet;

at least three closed compartments vertically arranged in said casing and including a first closed compartment, each closed compartment having at least one permeable wall and a perforated mainfold beneath one of said at least one permeable wall;

a particulate material in said at least three closed compartments;

a plurality of secondary filtering stages in said casing including a last secondary filtering stage, each containing a fine-fiber material which is different from the particulate material of the closed compartments;

said closed compartments of said at least three closed compartments and said plurality of secondary filtering stages forming a succession of filtering groups, each filtering group of said succession of filtering groups comprising at least one of said at least three closed compartments;

means for aerating said liquid during movement of said liquid by said means for moving said liquid by aerating means provided in each of the filtering groups;

said inlet of said biological filter being connected to said first closed compartment; and said outlet of said biological filter being connected to said last secondary filtering stage.

18. The biological filter of claim 17, wherein said means for moving said liquid and said means for aerating said liquid comprise an airlift device.

19. The biological filter of claim 17, wherein said first closed compartment contains a bed of activated carbon.

20. The biological filter of claim 19, wherein said means for moving said liquid and said means for aerating said liquid comprise an airlift device.

21. The biological filter of claim 17, wherein said first closed compartment contains a top bed and a bottom bed, said bottom bed comprising activated carbon.

22. The biological filter of claim 21, wherein said means for moving said liquid and said means for aerating said liquid comprise an airlift device.

23. The biological filter of claim 19, wherein one of said plurality of closed compartments comprises a bed of at least one salt selected from the group consisting of salts of alkali and alkali-earth metals.

24. The biological filter of claim 23, wherein said means for moving said liquid and said means for aerating said liquid comprise an airlift device.

25. The biological filter of claim 21, wherein one of said plurality of primary filtering stages comprises a bed of at least one salt selected from the group consisting of salts of alkali and alkali-earth metals.

26. The biological filter of claim 25, wherein said means for moving said liquid and said means for aerating said liquid comprise an airlift device.

27. The biological filter of claim 17, wherein at least one of said at least three closed compartments has partitions defining a plurality of filtering, said particulate material being accommodated in every second one of said plurality of filtering spaces.

28. The biological filter of claim 27, wherein said means for moving said liquid and said means for aerating said liquid comprise an airlift device.

29. The biological filter of claim 27, wherein at least one of said three closed compartments has a separating wall defining a prefiltering space extending over said filtering spaces, said prefiltering space comprising a bed of a particulate material.

30. The biological filter of claim 28, wherein at least one of said at least three closed compartments has a separating wall defining a prefiltering space extending over said filtering spaces, said prefiltering space comprising a bed of a particulate material.

31. A biological filter for purification of liquid having filtering materials covered with a biofloc film, said biological filter comprising:

a casing having an inlet and an outlet;

a first closed compartment, a second closed compartment and a third closed compartment vertically arranged in said casing, each having at least one permeable wall and a perforated manifold beneath one of said at least one permeable wall;

a particulate material in each of said first, second and third closed compartment;

a plurality of secondary filtering stages in said casing each containing a fire-fiber material which is different from the particulate material of the compartments;

a last secondary filtering stage of said plurality of secondary filtering stages;

said first closed compartment being connected to at least one of said plurality of secondary filtering stages;

said second closed compartment being connected to at least one of said plurality of secondary filtering stages;

said third closed compartment being connected to one of said plurality of secondary filtering stages:

means for moving said liquid, said means for moving said liquid being provided between one of said first, second, and third closed compartments and at least one of said plurality of secondary filtering stages, respectively;

means for aerating said liquid during movement of said liquid by said means for moving said liquid provided in each of the filtering stages;

said inlet of said biological filter being connected to said first closed compartment; and said outlet of said biological filter being connected to said last secondary filtering stage.

32. The biological filter of claim 31, wherein said means for moving said liquid and said means for aerating said liquid comprise an airlift device.

33. The biological filter of claim 31, wherein said first closed compartment contains a bed of activated carbon.

34. The biological filter of claim 33, wherein said means for moving said liquid and said means for aerating said liquid comprise an airlift device.

35. The biological filter of claim 31, wherein said first closed compartment contains a top bed and a bottom bed, said bottom bed comprising activated carbon.

36. The biological filter of claim 35, wherein said means for moving said liquid and said means for aerating said liquid comprise an airlift device.

37. The biological filter of claim 33, wherein one of said plurality of closed compartments contains a bed of at least one salt selected from the group consisting of salts of alkali and alkali-earth metals.

38. The biological filter of claim 37, wherein said means for moving said liquid and said means for aerating said liquid comprise an airlift device.

39. The biological filter of claim 35, wherein one of said plurality of primary filtering stages contains a bed of at least one salt selected from the group consisting of salts of alkali and alkali-earth metals.

40. The biological filter of claim 39, wherein said means for moving said liquid and said means for aerating said liquid comprise an airlift device.

41. The biological filter of claim 31, wherein said compartment has partitions defining a plurality of filtering spaces in said compartment, said particulate material being accommodated in every second one of said plurality of filtering spaces.

42. The biological filter of claim 41, wherein said means for moving said liquid and said means for aerating said liquid comprise an airlift device.

43. The biological filter of claim 41, wherein said compartment has a separating wall defining a prefiltering space extending over said filtering spaces, said prefiltering space comprising a bed of a particulate material.

44. The biological filter of claim 42, wherein said compartment has a separating wall defining a prefiltering space extending over said filtering spaces, said prefiltering space comprising a bed of a particulate material.

* * * * *